United States Patent
Farinacci et al.

(10) Patent No.: US 9,910,726 B2
(45) Date of Patent: Mar. 6, 2018

(54) SYSTEM DUMP ANALYSIS

(71) Applicant: INTERNATIONAL BUSINESS MACHINES CORPORATION, Armonk, NY (US)

(72) Inventors: Jesse L. Farinacci, Buffalo, NY (US); Marc A. Martin, Secaucus, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 15/045,699

(22) Filed: Feb. 17, 2016

(65) Prior Publication Data

US 2017/0235624 A1    Aug. 17, 2017

(51) Int. Cl.
   *G06F 11/07*  (2006.01)

(52) U.S. Cl.
   CPC ........ *G06F 11/079* (2013.01); *G06F 11/0751* (2013.01); *G06F 11/0778* (2013.01)

(58) Field of Classification Search
   CPC ............... G06F 11/366; G06F 11/0778; G06F 11/0742; G06F 11/3476; G06F 11/3636; G06F 11/3664; G06F 11/3668; G06F 11/3672; G06F 11/3676; G06F 11/3684; G06F 11/0748; G06F 11/0751
   See application file for complete search history.

(56) References Cited

U.S. PATENT DOCUMENTS

| 5,430,871 | A | 7/1995 | Jamoussi et al. |
| 5,778,350 | A | 7/1998 | Adams et al. |
| 7,028,056 | B1 * | 4/2006 | Hendel ............... G06F 11/3636 |
| 7,249,235 | B2 * | 7/2007 | Sexton .................. G06F 11/366 |
| | | | 707/999.2 |
| 8,166,313 | B2 * | 4/2012 | Fedtke ................ G06F 21/6254 |
| | | | 713/161 |

(Continued)

FOREIGN PATENT DOCUMENTS

GB    2422457 A    7/2006

OTHER PUBLICATIONS

Guangqi et al.; Memory Dump and Forensic Analysis Based on Virtual Machine; Proceedings of 2014 IEEE International Conference on Mechatronics and Automation; Aug. 3-6, Tianjin, China; pp. 1773-1777.

*Primary Examiner* — Nadeem Iqbal
(74) *Attorney, Agent, or Firm* — Cantor Colburn LLP; William A. Kinnaman, Jr.

(57) ABSTRACT

Technical solutions are described for analyzing a system dump. An example computer implemented method includes determining a fingerprint of the system dump, which identifies a model of the system and a type of the system dump. The method further includes receiving, from a first user device, a request to identify system dumps matching a set of system dump criteria and identifying the first user device based on the fingerprint of the system dump matching the set of system dump criteria specified, and sending access information of the system dump. The method also includes recording a query and its result as executed by the first user device against the system dump and sending, for receipt by a second user device, access information of the result of the query in the database, in response to the second user device requesting identification of system dumps matching said set of system dump criteria.

17 Claims, 6 Drawing Sheets

(56) References Cited

U.S. PATENT DOCUMENTS

| | | | | |
|---|---|---|---|---|
| 8,601,323 | B2* | 12/2013 | Tsantilis | G06F 11/079 714/42 |
| 8,621,282 | B1* | 12/2013 | Mixter | G06F 11/0706 714/38.11 |
| 8,949,672 | B1* | 2/2015 | Srihamat | G06F 11/366 714/38.1 |
| 9,697,068 | B2* | 7/2017 | Bello | G06F 11/0778 |
| 2003/0145083 | A1* | 7/2003 | Cush | G06F 11/0709 709/224 |
| 2008/0270994 | A1* | 10/2008 | Li | G06F 11/366 717/128 |
| 2011/0264960 | A1* | 10/2011 | Cho | G06F 11/0742 714/37 |

\* cited by examiner

SYSTEM DUMP ANALYSIS

BACKGROUND

The present application relates to diagnosing failures encountered by computer systems, and more specifically, to analyzing system dump data captured during and/or after a system failure occurrence.

In a computer system, when an operating system encounters a failure, such as a failure that causes the system to restart, it is desirable to collect diagnostic information on the state of the system and the steps that caused the failure to occur. Accordingly, in case of a failure, the system captures a dump, which is a snapshot of the virtual and/or real storage, and other aspects of the system. The captured snapshot contains information to diagnose the problem that caused the failure. The captured system dump contains a large amount of data and mining the data calls for expert and strategic querying of the data. Such analysis is resource intensive and time consuming.

SUMMARY

According to an embodiment, a computer implemented method for analyzing a system dump includes accessing a system dump that includes diagnostic data of a system that was captured in response to the system encountering a failure. The method further includes determining a fingerprint of the system dump, where the fingerprint identifies a model of the system and a type of the system dump; receiving, from a first user device, a request to identify system dumps matching a set of system dump criteria. The computer implemented method also includes identifying the first user device based on the fingerprint of the system dump matching the set of system dump criteria specified by the first user device. The method additionally includes sending, for receipt by the first user device, access information of the system dump. The method also includes recording a query executed by the first user device against the system dump, and recording a result of the query in a database. The method also includes sending, for receipt by a second user device, access information of the result of the query in the database, where the second user device requested identification of system dumps matching said set of system dump criteria.

According to another embodiment, a dump analysis system includes a memory configured to store a database, and a processor. The processor accesses a system dump that includes diagnostic data captured in response to a system failure. The processor determines a fingerprint of the system dump, where the fingerprint identifies a model of a system that encountered the system failure and a type of the system dump. The processor receives, from a first user device, a request to identify system dumps that match a set of system dump criteria. The processor also identifies the first user device based on the fingerprint of the system dump matching the set of system dump criteria specified by the first user device. The processor displays the system dump via the first user device. The processor records a query executed by the first user device against the system dump and records a result of the query in the database. The processor further receives, from a second user device, a request to receive the result of the query, where the second user device requested identification of system dumps matching said set of system dump criteria.

According to another embodiment, a computer program product for analyzing a system dump includes a computer readable storage medium. The computer readable storage medium includes computer executable instructions to access a system dump that includes diagnostic data captured in response to a system failure. The computer readable storage medium further includes computer executable instructions to determine a fingerprint of the system dump, where the fingerprint identifies a model of a system that encountered the system failure and a type of the system dump. The computer readable storage medium further includes computer executable instructions to receive, from a first user device, a request to identify system dumps that match a set of system dump criteria. The computer readable storage medium further includes computer executable instructions to identify the first user device based on the fingerprint of the system dump matching the set of system dump criteria specified by the first user device and display the system dump via the first user device. The computer readable storage medium further includes computer executable instructions to record a query executed by the first user device against the system dump, where the query identifies a specific portion of the system dump and record a result of the query in a database. The computer readable storage medium further includes computer executable instructions to receive, from a second user device, said query for execution, where the second user device requested identification of system dumps matching said set of system dump criteria. The computer readable storage medium further includes computer executable instructions to, which in response, communicate to the second user device, the result of the query that was recorded in the database.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
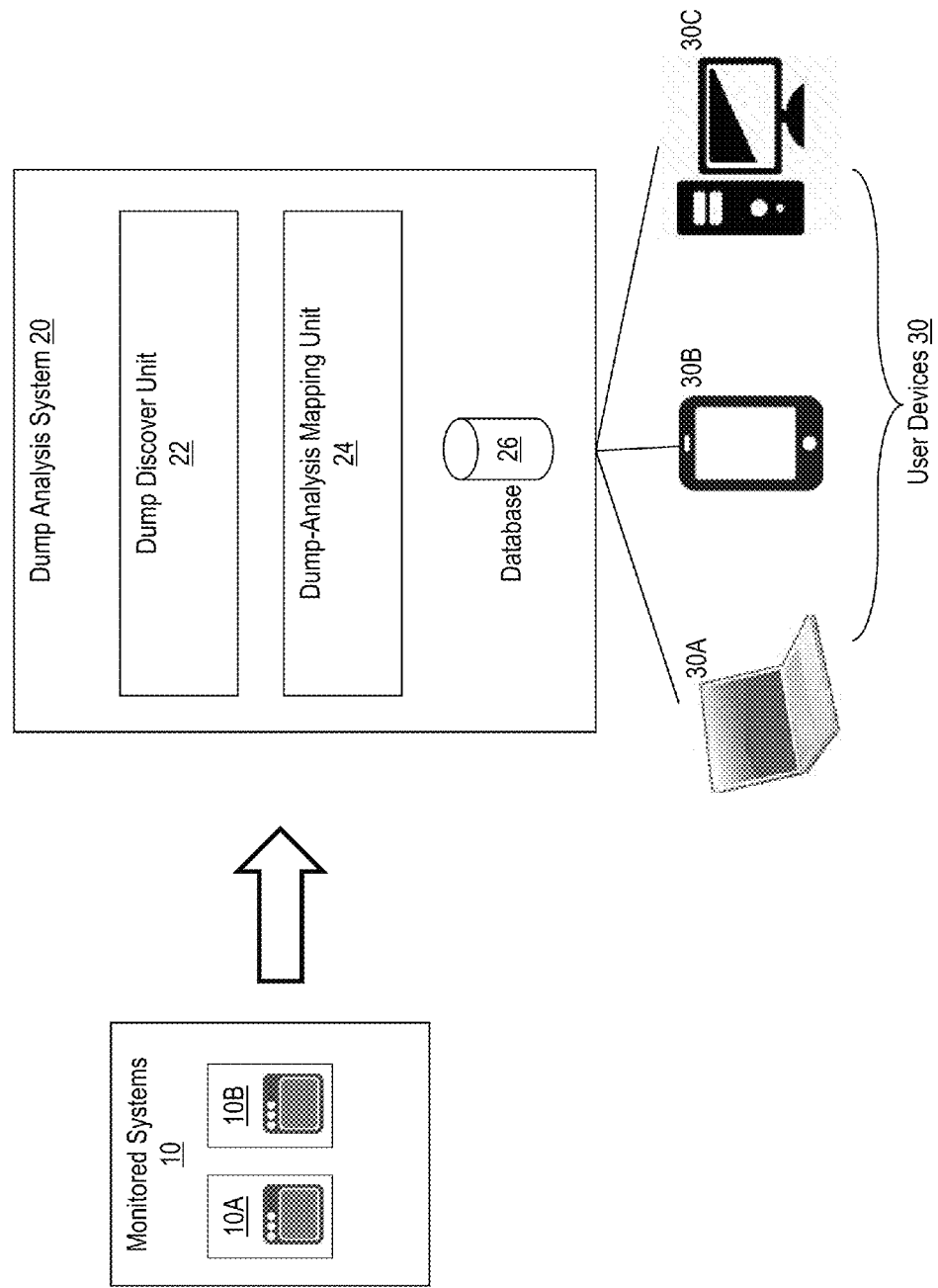
FIG. 1 illustrates a dump analysis system in accordance with an embodiment.

Disclosed here are technical solutions for facilitating a collaborative environment to analyze one or more system dumps. The technical solutions further facilitate capturing an analysis of a system dump and any queries associated with the system dump, and generating a set of computer executable instructions to replicate the analysis. Further, the technical solutions facilitate caching queries, and at least portions of the results of the queries, for quicker access at a later time. In addition, the technical solutions facilitate mapping the captured analysis, the generated computer executable instructions, and the queries and corresponding results with a fingerprint of a system dump. Accordingly, the captured analysis can be reused to analyze a future system dump.

The technical solutions capture the analysis that may be performed in a collaborative environment, for example by a team of experts from a development team and a test team. For example, two or more users may analyze one or more system dumps in collaboration, and sharing annotations, results of queries, comments, and other analysis with each other. In an example, the technical solutions may be embodied using JAVA EE protocols to facilitate such collaboration; however, it will be obvious that any other programming language and/or platform may be used to implement the technical solutions described herein. Accordingly, the technical solutions facilitate providing a shared way to analyze system dumps across teams, identifying and storing relevant system dumps, and storing queries as well as creating a standard for defect quality control. The technical solutions, in addition, facilitate organizing the system dumps in a way that makes searching defect data faster and more efficient than typical techniques, thus providing a faster turn-around for customers that encounter the system failure.

The technical solutions facilitate building or generating a set of computer executable instructions, such as using a scripting language such as Job Control Language (JCL), for analyzing a system dump. The set of computer executable instructions, which may be referred to as a batch, automates accessing specific portions of the system dump and determining diagnostic data in those portions. In an example, the system dump may be from IBM™ systems such as a SYSTEM Z™ server, or any other system that uses Z/OS™ as an operating system. Accordingly, the system dump may be analyzed using interactive problem control system (IPCS) commands. The batch may further facilitate accessing the system dump from a system dump storage, such as a direct access storage device (DASD) in an automated way. The system dumps discovered, or identified that match a specific criteria, may be further analyzed such as to identify cause of the system failure based on diagnostic parameters contained in the system dumps.

In addition, the technical solutions facilitates that work is not duplicated, thus mitigating resources used for the analysis. For example, if a system dump or query has been already accessed the process is streamlined. For example, a fingerprint of a system dump, which may include parameters such as a system name, a system model identification, a release name and/or identifier, a load module in error, an functional recovery routine (FRR) module, and the like is stored and mapped with analysis data. Accordingly, system dumps that match the fingerprint may be identified and analyzed in a similar manner. The IPCS queries/commands and corresponding results may be cached and stored mapped with the fingerprint. In an example, such data may be stored in a database, such as DB2™, or any other database, for a predetermined duration. For example, the predetermined duration may be a day, two weeks, a month, or any other time period that may facilitate skipping a network round trip of fetching the data from the system dump should another query request the same DUMP+IPCS_COMMAND combination.

Further yet, the technical solutions externalize the analysis using web technology for easy accessibility and collaboration.

FIG. 1 illustrates a dump analysis system 20 that analyzes system dumps from one or more monitored systems 10. The dump analysis system 20 analyzes the system dumps with assistance from users, such as experts, for example developers, testers, or other personnel knowledgeable about the monitored systems 10. The users may access the system dumps using user devices 30, based on access information that the dump analysis system 20 provides.

The monitored systems 10 may include one or more computer systems 10A, 10B. Of course, there may be more or fewer monitored systems 10 than those illustrated in FIG. 1. The monitored system may be any computer system, such as a server computer, a mainframe computer, or any other type of computer system. The one or more monitored systems 10 may include computer systems of the same type, such as same manufacturer, same model, same components, and so on. In other examples, the one or more monitored systems 10 may include different types of computer systems. For example, monitored system 10A may be an IBM SYSTEM Z™ server, and the monitored system 10B may be a HP SUPERDOME™ server. Of course, the monitored systems 10 may include other types of servers than those listed herein.

In an example, a monitored system 10A from the monitored systems 10, in case of a system failure, captures a system dump. In an example, the monitored system 10A sends the system dump to the dump analysis system 20. In another example, the monitored system 10A stores the system dump in a dump repository and provides access information of the system dump to the dump analysis system 20. The captured system dump contains diagnostic data of the system at the time of failure. The captured system dump, in addition, may contain diagnostic data from a predetermined time prior to the occurrence of the system failure. The system dump may include recorded state of memory of the monitored system 10A at a specific time, generally when the system 10A encounters a 'crash' or otherwise terminated abnormally. In addition, the system dump may include other pieces of program state from the time of the failure, such as processor registers, which may include program counter and stack pointer, memory management information, and other processor and operating system flags and information that may assist in diagnosing and debugging the system failure.

The user devices 30 may include one or more communication apparatus that facilitate the users to assist with analysis of the system dumps. The user devices 30 may be of the same type or of different types. For example, the user devices 30 may include a communication apparatus such as a desktop computer, a laptop computer, a phone, a tablet computer, or any other communication apparatus that facilitates the user to communicate with the dump analysis system 20, or any other system via a communication network, such as a wired or a wireless communication network.

The dump analysis system 20 includes, among other components, a dump discovery unit 22, a dump-analysis mapping unit 24, and a database 26. The components may be hardware or a combination of hardware and software. For example, the components may be electronic circuitry, such as application specific integrated circuits (ASICs), field programmable gate arrays (FPGAs), processors, or any other types of hardware controlled by computer executable instructions or logic. In addition, or alternatively, the components may include computer readable memory that includes computer executable instructions.

Figure 2:
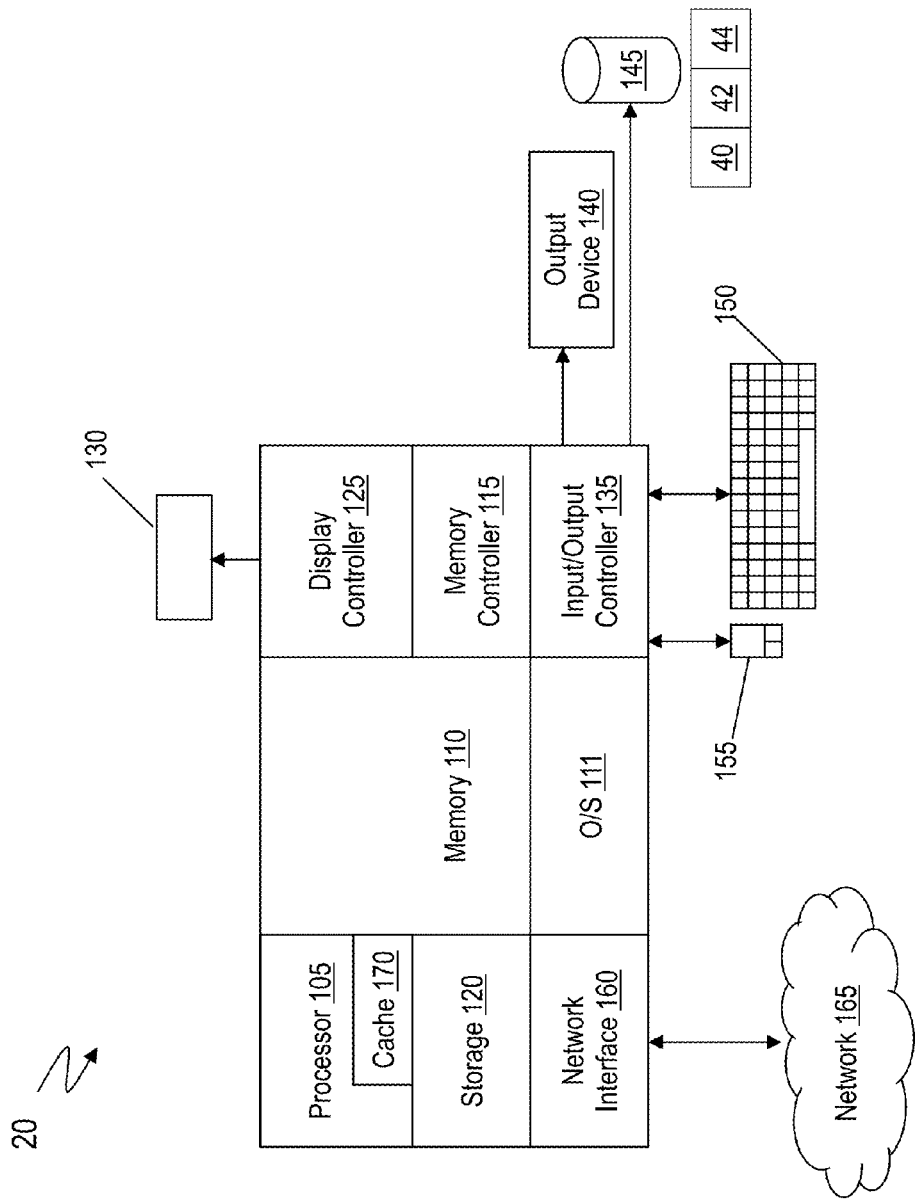
FIG. 2 illustrates example components of the dump analysis system 20 in accordance with an embodiment.

FIG. 2 illustrates example components of the dump analysis system 20. In an example, the dump analysis system 20 may be a communication apparatus, such as a computer. For example, the dump analysis system 20 may be a server computer, or any other device that communicates via a network 165. The dump analysis system 20 includes hardware, such as electronic circuitry.

The dump analysis system 20 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the dump analysis system 20, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The dump analysis system 20 may further include a display controller 125 coupled to a user interface or display 130. In some embodiments, the display 130 may be an LCD screen. In other embodiments, the display 130 may include a plurality of LED status lights. In some embodiments, the dump analysis system 20 may further include a network interface 160 for coupling to a network 165. The network 165 may be an IP-based network for communication between the dump analysis system 20 and an external server, client and the like via a broadband connection. In an embodiment, the network 165 may be a satellite network. The network 165 transmits and receives data between the dump analysis system 20 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
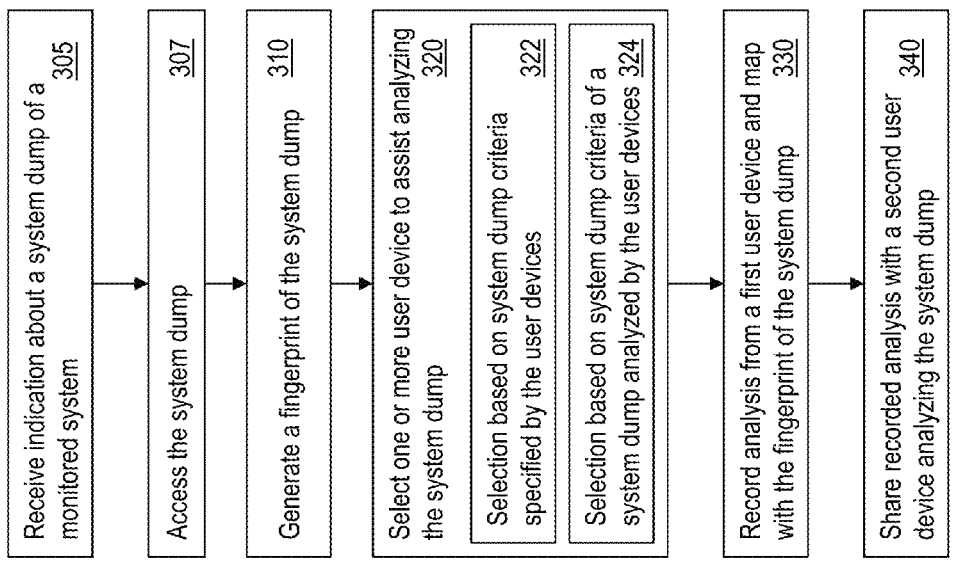
FIG. 3 illustrates a flowchart of an example method for analyzing the system dump in accordance with an embodiment.

FIG. 3 illustrates a flowchart of an example method for analyzing the system dump according to the technical solutions described herein. The dump analysis system 20 receives a notification about the system dump being available from the monitored system 10A, as shown at block 305. The dump analysis system 20 accesses the system dump, as shown at block 307. The system dump may include diagnostic data of the monitored system 10A, the diagnostic data captured in response to the monitored system 10A encountering a failure. The dump analysis system 20 determines a fingerprint of the system dump, as shown at block 310. For example, the fingerprint identifies a model of the system and a type of the system dump. In an example, the dump analysis system 20 determines or generates the fingerprint of the system dump by parsing the information from a header of the system dump.

The dump analysis system 20 identifies a first user device 30A from the user devices 30 based on the fingerprint of the system dump, as shown at block 320. For example, the dump analysis system 20 selects the first user device 30A based on the fingerprint matching a set of system dump criteria specified by the first user device 30A, as shown at block 322. In an example, the dump analysis system 20 receives, from the first user device 30A, a request to identify system dumps matching the set of system dump criteria. In another example, the dump analysis system 20 selects the first user device 30A based on the first user device 30A having previously analyzed a system dump that has a fingerprint that matches the fingerprint of the current system dump, as shown at block 324. The dump analysis system 20 keeps track of the fingerprints of the system dumps that each of the user devices 30 analyze. For example, the dump analysis system 20 keeps a log of the fingerprints of the system dumps that the first user device 30A analyzed. The log may be stored in the database 26.

The dump analysis system 20 may send access information of the system dump to the first user device 30A. For example, the dump analysis system 20 may provide a location of the system dump to the first user device 30A. Alternatively, the dump analysis system displays the system dump via the first user device 30A.

The dump analysis system 20 further tracks the analysis steps that the first user device 30A performs to analyze the system dump. The dump analysis system 20 records the steps performed by the first user device 30A, and stores a mapping between the recorded analysis and the fingerprint of the system dump, as shown at block 330.

Figure 4:
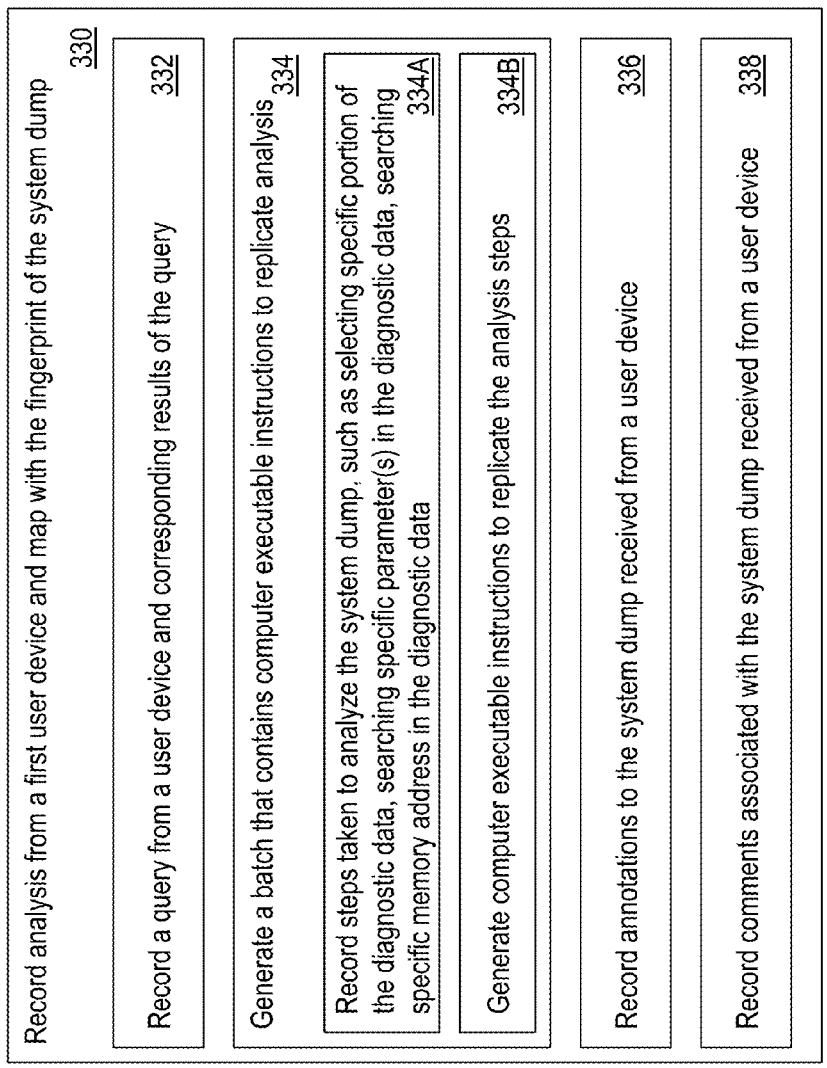
FIG. 4 illustrates a flowchart of receiving and recording analysis data in accordance with an embodiment.

FIG. 4 illustrates a flowchart of receiving and recording analysis data. For example, the dump analysis system 20 receives analysis data from the user devices 30, which the dump analysis system 20 records, and further for which the dump analysis system 20 generates one or more batches. In an example, the dump analysis system 20 records a query executed by the first user device 30A against the system dump, as shown at block 332. The dump analysis system 20 further records results of the query in the database 26, as shown at block 332. The dump analysis system 20 stores the query and the corresponding results in the database 26, mapped with the fingerprint of the system dump.

In another example, the dump analysis system 20 generates a batch that contains computer executable instructions to replicate analysis performed by the first user device 30A, as shown at block 334. For example, the dump analysis system 20 records a series of analysis steps performed on the system dump by the first user device, as shown at block 334A. The analysis steps may include selecting specific portion of the diagnostic data, searching specific parameter(s) in the diagnostic data, searching specific memory address in the diagnostic data. For example, diagnostic data located at particular memory address of the monitored system 10A may identify a symptom and/or cause of the system failure. The dump analysis system 20 generates computer executable instructions to replicate the analysis steps, as shown at block 334B. For example, the computer executable instructions may be in a programming language such as JAVA, or a scripting language, such as JCL, or any other computer executable form. The dump analysis system 20 stores the batch mapped with the fingerprint of the system dump.

In yet another example, the dump analysis system 20 keeps track of an annotation that the first user device 30A makes on the system dump. For example, the first user device 30A may highlight a specific portion of the system dump, or mark the specific portion, such as by overlaying the specific portion with a shape, such as a box, oval and so on. Of course, the first user device 30A may annotate the system dump in other ways. The dump analysis system 20 records the annotation in the database, mapped with the fingerprint of the system dump, as shown at block 336. The dump analysis system 20 further receives and stores comments or notes for the system dump that the user makes via the first user device 30A. The dump analysis system 20 stores the comments in the database 26, mapped with the fingerprint of the system dump, as shown at block 338. The comments may be in the form of text, images, icons, audio data, video data, or any other content that may be digitally recorded.

Referring back to FIG. 3, the dump analysis system 20 shares the recorded analysis with other user devices that are analyzing the system dump, and/or other system dumps that match the fingerprint of the current system dump, as shown at block 340. For example, the second user device 30B may be analyzing the same system dump that the first user device 30A is analyzing. For example, the respective users of the first user device 30A and the second user device 30B may be analyzing the system dump collaboratively. In another example, the user of the second user device 30B may be an apprentice, observing the analysis being performed by an experienced user via the first user device 30A. In yet another example, the user of the second user device 30B may be analyzing another system dump that matches the fingerprint of the system dump that the first user device 30A analyzed. In an example, a third user device 30C may be analyzing a different system dump that does not match the system dump that the first user device 30A is analyzing. In another example, the third user device 30C may also be analyzing the system dump that the first user device 30A is analyzing. In yet another example, the third user device 30C may be analyzing a separate system dump that has a fingerprint that matches the fingerprint of the system dump that the first user device 30A is analyzing.

Figure 5:
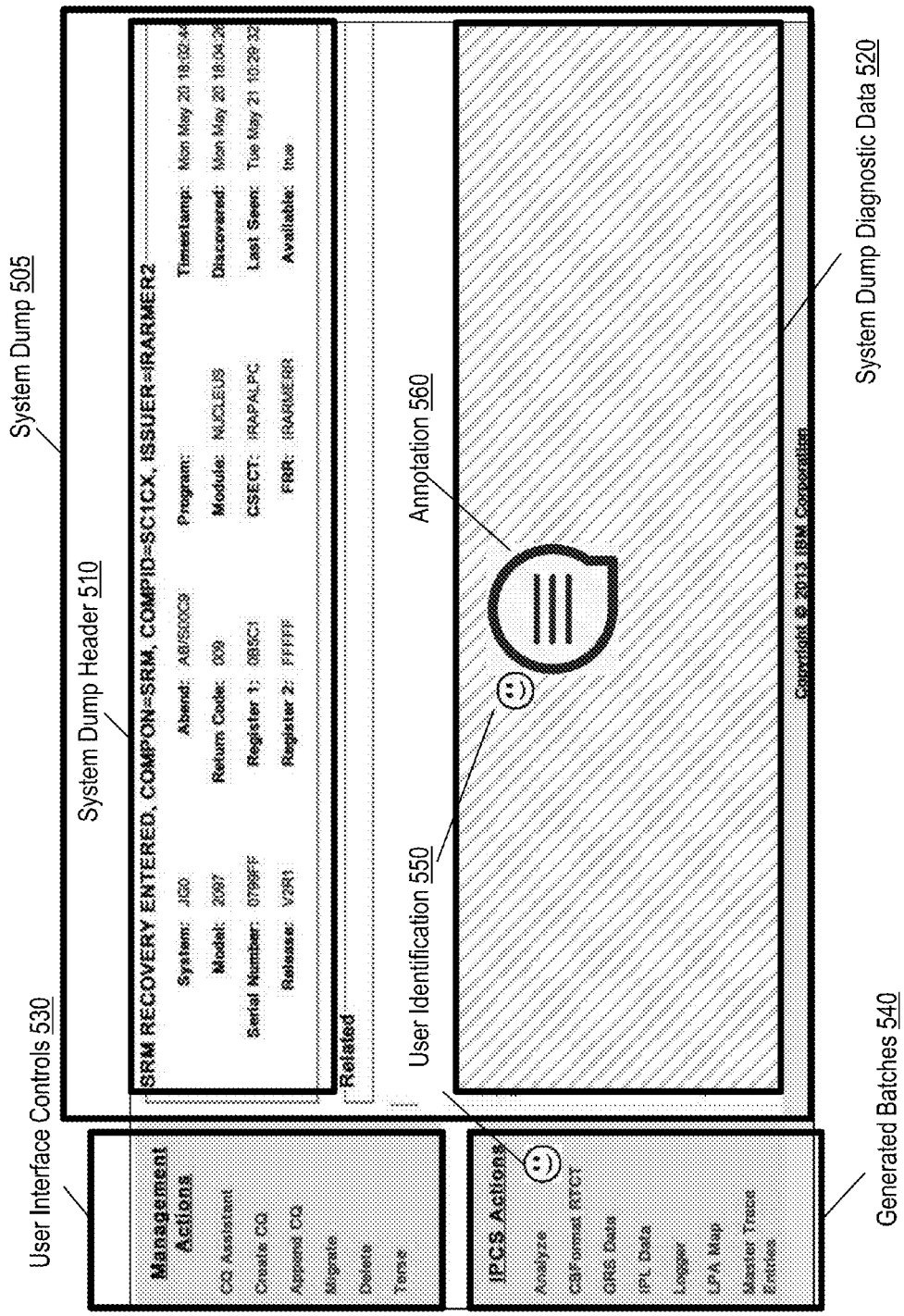
FIG. 5 illustrates information that the dump analysis shares with user devices in accordance with an embodiment.
Figure 6:
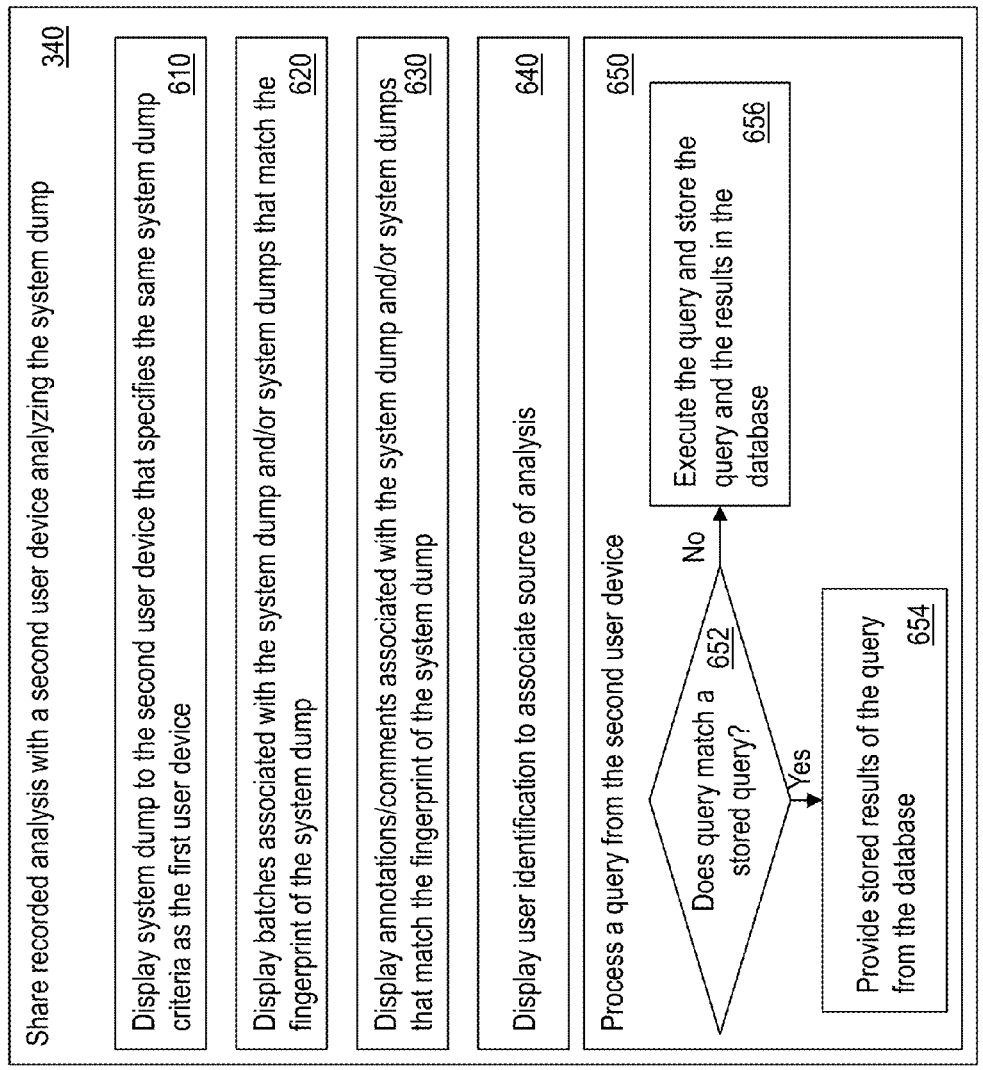
FIG. 6 illustrates a flowchart of an example method for displaying and interacting with analysis information displayed on user devices by an example dump analysis system in accordance with an embodiment.

FIG. 5 illustrates information that the dump analysis system 20 displays to the user devices 30. FIG. 6 illustrates a flowchart of an example method for displaying and interacting with the analysis information displayed on the user devices by the dump analysis system 20. In an example, the dump analysis system 20 displays a system dump 505 that the first user device 30A analyzed, as shown at step 610. The system dump 505 includes a header 510 that the dump analysis system 20 parses to generate the fingerprint. The system dump 505 further includes the diagnostic data portion 520 that the dump analysis system 20 queries according to analysis steps from the first user device 30A. FIG. 5 further illustrates user interface controls 530 that the dump analysis system 20 displays via the user devices 30. The user interface controls facilitate the user to navigate the system dump 505, as well as perform one or more analysis steps of his/her choice. The dump analysis system 20 further displays one or more batches 540, as shown at block 620. The batches 540 may be collections of computer executable instructions that replicate analysis steps taken by the first user device 30A or any other user device on the system dump 505. In an example, the dump analysis system 20 may display the annotation recorded for the system dump 505 or any other system dump that matches the fingerprint of the system dump 505, as shown at block 630. The dump analysis system 20, in an example, displays user identification 550 that identifies to the user of the second user device 30B the source of the analysis information, as shown at block 640. For example, the user of the second user device 30B, based on the user identification 550, may note that a first batch in the batches 540 replicates analysis steps taken by a user of the first user device 30A, while the annotation 560 was made by a user of a third user device from the user devices 30.

The user of the second user device 30B may perform his/her analysis using the user interface controls 530. The dump analysis system 20 records the analysis from the second user device 30B and shares the same with the other user devices that are interested in the system dump 505 or other system dumps that match the fingerprint of the system dump 505.

In an example, the second user device 30B may enter a query for the dump analysis system 20 to forward to the system dump, as shown at block 650. The query may be to identify a specific portion of the diagnostic data 520. The dump analysis system may check if the query from the second user device 30B is the same query that the first user device 30A had already initiated, as shown at block 652. If the queries match, the dump analysis system 20 sends the second user device 30B access information of the results of the query that was initiated by the first user device 30A, as shown at block 654. The access information may facilitate the second user device 30B to access the results of the query from the database 26, where the dump analysis system 20 stores the results. If the queries do not match, the dump analysis system 20 forwards the query to the DASD that stores system dump, such as via the network, and stores the query and the corresponding results in the database 26, mapped with the fingerprint of the system dump 505, as shown at block 656. The query and the results may be subsequently shared with another user device from the user devices 30, if the case arises.

Accordingly, the technical solutions facilitate one or more user devices to analyze a system dump in a collaborative manner using analysis performed by each other in similar circumstances, such as on the same system dump or on system dumps that have similar fingerprints. For example, the fingerprint of a system dump may identify a system name, system model number, operating system version and release number being used, and other such characteristics of the system that encountered the system failure. Accordingly, if a first fingerprint matches a second fingerprint, the two system dumps may be captured from monitored systems with similar configurations. Accordingly, an analysis performed on the system dump with the first fingerprint may be applicable to use on a system dump with the second fingerprint. In addition, the technical solutions facilitate an apprentice user to observe an analysis that was performed by a more skilled or experienced user by browsing the recorded analysis steps.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for analyzing a system dump, the method comprising:
    accessing a system dump that comprises diagnostic data of a system that was captured in response to the system encountering a failure;
    determining a fingerprint of the system dump, wherein the fingerprint identifies a model of the system and a type of the system dump;
    receiving, from a first user device, a request to identify system dumps matching a set of system dump criteria;
    identifying the first user device based on the fingerprint of the system dump matching the set of system dump criteria specified by the first user device;
    sending, for receipt by the first user device, access information of the system dump;
    recording a query executed by the first user device against the system dump;
    recording a result of the query in a database;
    sending, for receipt by a second user device, access information of the result of the query in the database, wherein the second user device requested identification of system dumps matching said set of system dump criteria;
    receiving, from the first user device, an annotation for the system dump, wherein the annotation comprises a note for a specific portion of the system dump; and
    storing a mapping between the annotation and the fingerprint of the system dump.

2. The computer implemented method of claim 1, further comprising:
    recording a series of analysis steps performed on the system dump by the first user device;
    generating a set of computer executable instructions to replicate the analysis steps; and
    storing a mapping between the set of computer executable instructions and the fingerprint of the system dump.

3. The computer implemented method of claim 2, further comprising displaying, via the second user device, a prompt to execute the set of computer executable instructions to replicate the analysis steps performed by the first user device.

4. The computer implemented method of claim 1, further comprising displaying, via the second user device, the annotation recorded by the first user device.

5. The computer implemented method of claim 4, wherein the annotation is a first annotation, and the mapping is a first mapping, the method further comprising:
    receiving, from the second user device, a second annotation for the system dump; and
    storing a second mapping between the second annotation and the fingerprint of the system dump.

6. The computer implemented method of claim 5, further comprising:
    receiving, from a third user device, a request to identify system dumps matching said set of system dump criteria; and
    in response, communicating, to the third user device:
        the access information of the system dump;
        an indication of the first user device and the second user device that specified said set of system dump criteria;
        the first annotation based on the first mapping; and
        the second annotation based on the second mapping.

7. The computer implemented method of claim 1, further comprising:
    receiving, from a third user device, a request to identify system dumps matching said set of system dump criteria; and
    in response, communicating, to the third user device:
        the access information of the system dump; and
        an indication of the first user device and the second user device that specified said set of system dump criteria.

8. The computer implemented method of claim 7, further comprising communicating to the third user device a prompt to request results of the query executed by the first user device.

9. A dump analysis system comprising:
    a memory configured to store a database;
    a processor configured to:
        access a system dump that comprises diagnostic data captured in response to a system failure;
        determine a fingerprint of the system dump, wherein the fingerprint identifies a model of a system that encountered the system failure and a type of the system dump;
        receive, from a first user device, a request to identify system dumps that match a set of system dump criteria;
        identify the first user device based on the fingerprint of the system dump matching the set of system dump criteria specified by the first user device;
        display the system dump via the first user device;
        record a query executed by the first user device against the system dump;
        record a result of the query in the database; and
            receive, from a second user device, a request to receive the result of the query, wherein the second user device requested identification of system dumps matching said set of system dump criteria;
        receive, from the first user device, an annotation for the system dump, wherein the annotation comprises a note for a specific portion of the system dump; and
        store a mapping between the annotation and the fingerprint of the system dump.

10. The dump analysis system of claim 9, wherein the processor receives the request from the second user device in response to a communication by the processor to the second user device, the communication including an identification of the first user device and the query being executed by the first user device.

11. The dump analysis system of claim 9, wherein the processor further is configured to:
   record a series of analysis steps performed on the system dump by the first user device;
   generate a set of computer executable instructions to replicate the analysis steps; and
   store a mapping between the set of computer executable instructions and the fingerprint of the system dump.

12. The dump analysis system of claim 11, wherein the processor is further configured to display, via the second user device, a prompt to execute the set of computer executable instructions to replicate the analysis steps performed by the first user device.

13. The dump analysis system of claim 9, wherein the processor is further configured to display via the second user device, the annotation recorded by the first user device and an identification of the first user device.

14. The dump analysis system of claim 9, wherein the processor is further configured to:
   receive, from a third user device, a request to identify system dumps matching said set of system dump criteria; and
   in response, communicate, to the third user device:
      an access information of the system dump;
      an indication of the first user device and the second user device that specified said set of system dump criteria; and
      a prompt to request results of the query executed by the first user device.

15. A non-transitory computer-readable storage medium storing a computer program product for analyzing a system dump, wherein the computer readable storage medium comprises instructions to:
   access a system dump that comprises diagnostic data captured in response to a system failure;
   determine a fingerprint of the system dump, wherein the fingerprint identifies a model of a system that encountered the system failure and a type of the system dump;
   receive, from a first user device, a request to identify system dumps that match a set of system dump criteria;
   identify the first user device based on the fingerprint of the system dump matching the set of system dump criteria specified by the first user device;
   display the system dump via the first user device;
   record a query executed by the first user device against the system dump, wherein the query identifies a specific portion of the system dump;
   record a result of the query in a database;
   receive, from a second user device, said query for execution, wherein the second user device requested identification of system dumps matching said set of system dump criteria, and
   in response, communicate to the second user device, the result of the query that was recorded in the database;
   receive, from the first user device, an annotation for the system dump, wherein the annotation comprises a note for a specific portion of the system dump;
   store a mapping between the annotation and the fingerprint of the system dump; and
   display via the second user device, the annotation recorded by the first user device and an identification of the first user device.

16. The computer program product of claim 15, wherein the computer storage medium further comprises instructions to:
   record a series of analysis steps performed on the system dump by the first user device;
   generate a set of computer executable instructions to replicate the analysis steps;
   store a mapping between the set of computer executable instructions and the fingerprint of the system dump; and
   display, via the second user device, a prompt to execute the set of computer executable instructions to replicate the analysis steps performed by the first user device.

17. The computer program product of claim 15, wherein the computer storage medium further comprises instructions to:
   receive, from a third user device, a request to identify system dumps matching said set of system dump criteria; and
   in response, communicate, to the third user device:
      an access information of the system dump;
      an indication of the first user device and the second user device that specified said set of system dump criteria; and
      a prompt to request results of the query executed by the first user device.

* * * * *